Figure 1:
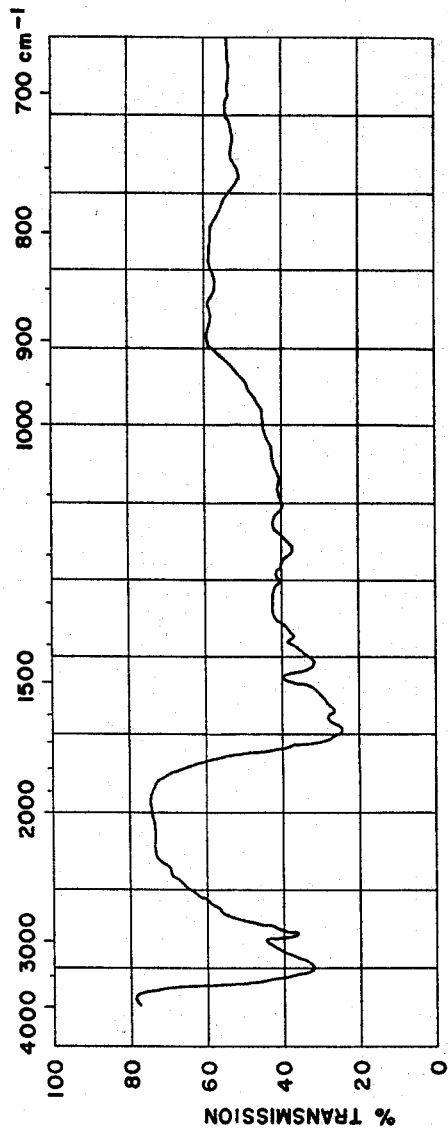

June 11, 1963 E. GAEUMANN ET AL 3,093,550
PROCESS FOR THE MANUFACTURE OF FERRIMYCIN
Filed March 15, 1961 4 Sheets-Sheet 1

ERNST GAEUMANN
ERNST VISCHER and
HANS BICKEL
Inventor

By Harry Goldsmith and Joseph
Attorneys

ERNST GAEUMANN
ERNST VISCHER and
HANS BICKEL
Inventor

June 11, 1963  E. GAEUMANN ET AL  3,093,550
PROCESS FOR THE MANUFACTURE OF FERRIMYCIN
Filed March 15, 1961  4 Sheets-Sheet 3
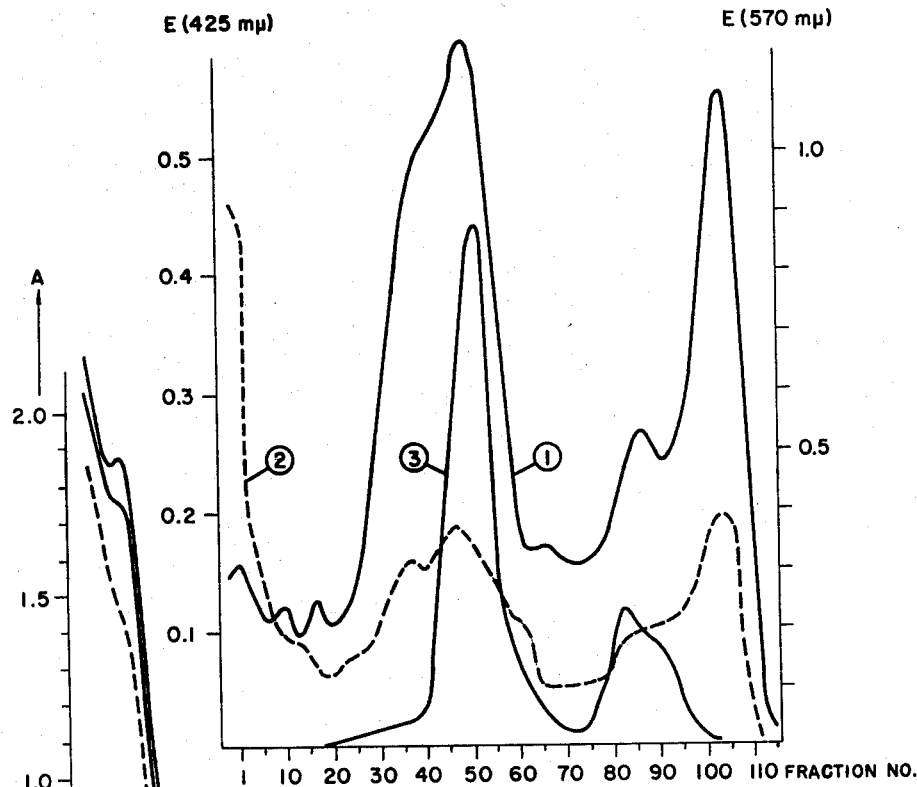
FIG. 6
FIG. 5
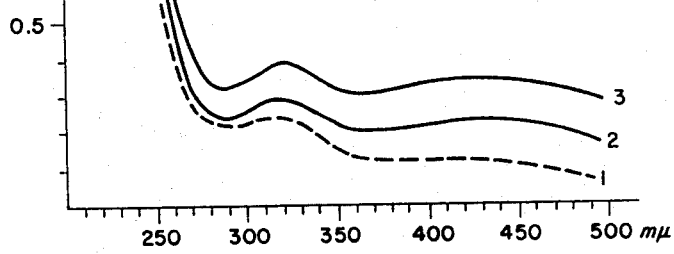
Inventor
Attorneys June 11, 1963  E. GAEUMANN ET AL  3,093,550
PROCESS FOR THE MANUFACTURE OF FERRIMYCIN
Filed March 15, 1961  4 Sheets-Sheet 4

ERNST GAEUMANN
ERNST VISCHER and
HANS BICKEL

Inventor

United States Patent Office 3,093,550
Patented June 11, 1963

3,093,550
PROCESS FOR THE MANUFACTURE
OF FERRIMYCIN
Ernst Gaeumann, Zurich, Ernst Vischer, Basel, and Hans
Bickel, Binningen, Switzerland, assignors to Ciba Corporation, a corporation of Delaware
Filed Mar. 15, 1961, Ser. No. 95,843
Claims priority, application Switzerland Mar. 18, 1960
25 Claims. (Cl. 195—80)

U.S. patent application Serial No. 749,616, filed July 21, 1958 (now abandoned), by Vladimir Prelog et al., provides a new water-soluble antibiotic A 9578 obtained by cultivating the Actinomycetes strain *S. griseoflavus* A 9578 or mutants thereof. The present invention is based on the observation that the identical antibiotic—which we shall call henceforward ferrimycin—and its constituents such, for example as the ferrimycins A, A1, A2 and B, are also obtained in cultivating a strain of *S. lavendulae*, A 21510.

The strain A 21510 was isolated from a soil specimen collected in the Canton Obwalden, Switzerland, and is kept at our laboratories and at the Federal Institute of Technology, Institute for Special Botany, Zurich, Switzerland, under that designation and at the United States Department of Agriculture, Agricultural Research Service, Northern Utilization Research and Development Division, Peoria, Illinois, under the designation NRRL 2856. The organism displays the following characteristic features: The spores have a smooth surface; the air mycelium is pale-carmine to cinnamon brown to brownish grey; the spore chains form open irregular loops and spirals at the ends of long straight or only slightly undulated sporophores; when the fungus is grown on a nutrient medium containing peptone, a blackish brown melanoid coloration appears. The growth is relatively independent of the temperature, and the fungus develops well both at 18° and at 40° C., the optimum temperature ranging from 25 to 32° C.

To characterize *Streptomyces lavendulae* strain A 21510, further, its growth on different nutrient media is described below. The nutrient media 1 to 7 and 10 were prepared as described by W. Lindenbein in Arch. Mikrobiol. 17, page 361 [1952]. The media 11 and 12 were prepared according to Pridham et al. (Antibiotics Annual 1956–1957, page 947). Medium 13 was prepared according to Tresner and Danga (J. Bacteriology 76, page 239 [1958]), while medium 14 was prepared as described in the Manual of Methods for Pure Culture Study of Bacteria, Committee on Bacteriological Technics of Soc. Amer. Bacteriol., Biotechn. Publications, Geneva, N.Y. [1946].

(1) Synthetic agar: Growth thin, cloudy, whitish yellow; air mycelium very sparse, only forming a dusty coating.
(2) Synthetic solution: Sediment, whitish yellow to pale-yellow flocks.
(3) Glucose-agar: Growth thin, cloudy or pustular, pale-brown to dark brown; substratum partially colored dark brown; air mycelium initially snow-white with pale-carmine spots, subsequently gradually darkening to cinnamon brown to brownish grey.
(4) Glucose-asparagine-agar: Growth thin, cloudy to pustular, pale-brown to dark brown; substratum colored pale-brown; air mycelium velvety pale-carmine to cinnamon brown.
(5) Calcium malate-agar: Growth thin, cloudy, pale-brown with sparse pale-carmine air mycelium.
(6) Gelatine stab (27° C.): Growth in the stab dark brown or brownish yellow; substratum colored dark brown; no air mycelium; liquefaction absent or only very sparse.
(7) Starch plate: Growth sparse, punctiform or pustular, whitish yellow; hydrolysis after 10 days: 11 mm.
(8) Potatoes: Growth initially thin, cloudy, subsequently wrinkled, pale-brown to dark brown to brownish black; substratum colored dark brown; air mycelium sparse, punctiform, pale-carmine.
(9) Carrots: Growth very sparse.
(10) Litmus milk: Growth sparse, annular, pustular, pale-brown to brownish yellow; sparse coagulation and sparse peptonisation; litmus substantially red, partially blue.
(11) Yeast extract-agar: Growth thin, cloudy to wrinkled, pale-brown to dark brown; substratum slightly colored dark brown; air mycelium very well developed, velvety pale-carmine to cinnamon brown.
(12) Carvajal's oatmeal agar: Growth thin, cloudy, pale-yellow; air mycelium velvety, initially chalk-white, later on cinnamon brown.
(13) Peptone-iron-agar: Positive reaction.
(14) Nitrate broth: Nitrates are reduced to nitrites.

With respect to the characteristic features described above—more especially the morphology of the spores and spore chains, the color of the air mycelium and the capacity of forming melanine when grown on a nutrient medium containing petone (see Ettlinger et al., Arch. Mikrobiol. 31, page 326 [1958])—the strain A 21510 corresponds to *Streptomyces lavendulae* and it is therefore provisionally classified together with this genus.

It is known that a number of other representatives of the genus *S. lavendulae* produce antibiotics. However, as will be shown below, these known substances differ in a characteristic manner from the ferrimycins.

As far as the production of the ferrimycins is concerned the present invention is not limited to the use of *S. lavendulae* A 21510 or of other strains corresponding to the above description; it includes also the use of variants of these organisms such as are obtained for example by selection or mutation, more especially under the action of ultraviolet or X-rays or of nitrogen mustard oils.

The ferrimycins are obtained when a Streptomycetes strain corresponding to the above description is grown in an aqueous nutrient solution containing a carbon and nitrogen source, if desired growth-promoting substances, as well as inorganic salts under aerobic conditions until the nutrient solution displays a substantial antibacterial action, whereupon the ferrimycins are isolated.

Suitable carbon sources are, for example assimilable carbohydrates such as glucose, saccharose, lactose, mannitol, starches and glycerol. As nitrogeneous nutrients and if desired growth-promoting substances may be mentioned: amino acids, peptides and proteins and their breakdown products such as peptone or tryptone, furthermore meat extracts, water-soluble constituents of cereal grains, such as maize and wheat, of distillation radicals of the alcohol manufacture, of yeast, beans, more especially of soybean plants, of seeds, for example cotton seeds and the like, as well as ammonium salts and nitrates. Other inorganic salts which may be present in the nutrient solution are, for example, chlorides, carbonates or sulfates of alkali metals, alkaline earth metals, magnesium, iron, zinc or manganese.

The cultivation is performed under aerobic conditions, for example in a static surface culture or preferably submerged with shaking or stirring with air or oxygen in shaking flasks or in the known fermenters. Suitable temperatures are within the range of 18 to 40° C. Under these conditions the nutrient solution develops a substantial antibacterial action in general within 1 to 5 days.

The ferrimycins can be isolated for example in the following manner: the mycelium is separated from the culture filtrate, whereupon the bulk of the ferrimycins is found in the culture filtrate. However, substantial amounts of the ferrimycin is still remain adsorbed on the mycelium and it is therefore of advantage to wash the latter thoroughly; for this purpose may be used water and aqueous organic solvents such as alcohols, for example aqueous methanol.

There are several methods available for extracting the ferrimycins from the culture filtrate and for purifying and separating them, and any one of these methods or a combination of two or more such methods can be used. It has proved advantageous to maintain the pH of the culture solution during these operations between 3 and 5.

(1) An adsorbent can be used, for example an active carbon such as Norit or an activated earth such as fuller's earth or floridine or an adsorbent resin such as Asmit. The adsorbates are advantageously eluted with a mixture of a water-miscible organic solvent with water or an aqueous acid, for example a mixture of water with methanol, water with pyridine, dilute acetic acid with methanol or water+methanol+glacial acetic acid+butanol. It has proved particularly advantageous to elute a Norit adsorbate with a mixture of 2 parts by volume of water, 1 part by volume of methanol, 1 part by volume of methanol, 1 part by volume of glacial acetic acid and 2 parts by volume of butanol.

(2) According to another method of separating the ferrimycins from the culture filtrate the antibiotic activity is adsorbed on a cation-exchanger for which purpose resins containing acid groups, such as Amberlite IRC–50, are especially suitable. This resin can be used either in the acid form or in the sodium form, though a mixture of these two forms in the ratio of 1:2 by volume has proved particularly useful. The elution is advantageously carried out with a dilute acid, for example with methanolic hydrochloric acid.

(3) It is also possible to precipitate the basic ferrimycin directly from the culture filtrate, for example by reaction with an organic acid of the type of picric acid. When such a precipitate is treated with a salt of an organic base, for example with triethylammonium sulfate, or with a dilute acid, the antibiotic is obtained in the form of the relevant salt. This reaction can be carried out either in an aqueous medium or in a solvent miscible with water, such as methanol or acetone. This conversion of a sparingly soluble into a readily soluble salt of the ferrimycins is carried out either with a mineral acid or on an ion exchanger resin, for example on Amberlite IRA–400.

(4) Furthermore the ferrimycins can be enriched by treating an aqueous or alcoholic-aqueous solution of the salt with an excess of an organic water-miscible solvent such as acetone, dioxane or the like, whereby the salt is precipitated in the solid form.

(5) According to another method of enriching and/or separating the ferrimycins an aqueous solution thereof is extracted with a solution of phenol in chloroform, while varying both the pH value of the aqueous solution and the phenol content of the chloroform solution. Thus, example on Norit, alumina, magnesium silicates, silica between a solution containing for every 100 cc. of chloroform 100 grams of phenol, and an aqueous phase of pH 1 to 6 it is present almost exclusively in the organic phase, while when a solution is used that contains for every 100 cc. of chloroform only 33 grams of phenol it can be extracted approximately completely from the aqueous phase only when the pH of the latter is 4 to 6. Taking as the coefficient of distribution of the ferrimycins the ratio of their concentration in the organic phase to their concentration in the aqueous phase, it will be realised from the foregoing that as the content of phenol in the organic phase is increased the coefficient of distribution rises and that it drops as the pH value of the aqueous phase is lowered. Since it is thus possible to establish in this system any desired coefficient of distribution of the ferrimycins, a large portion of inactive impurities can be removed by combining a few distribution operations.

(6) Another method of enriching and/or separating the ferrimycins from one another is chromatography, such as adsorption chromatography on different materials, for example on Norit, alumina, magnesium silicates, silica gel or calcium sulfate; also partition chromatography with the use of cellulose, starches, silica gel, Celite or the like as substratum; or chromatography on ion-exchanger resins, for example on Dowex-50, Amberlite IRC–50 or the like. Thus, for example, especially useful results have been achieved by partition chromatography on cellulose, using the solvent system: 4 parts by volume of butanol— 1 part by volume of glacial acetic acid—5 parts by volume of water, as well as chromatography on strongly acidic ion-exchangers, such as Dowex 50 WX$_2$ in an ammonium acetate buffer solution (pH 4.5) of ascending concentration.

(7) Furthermore the ferrimycins can be enriched and/or separated from one another by counter-current distribution according to Craig between two immiscible solvent phases. For this purpose the following solvent systems have proved especially advantageous:

(a) Secondary butanol—0.1 N-ammonium acetate buffer solution of pH 4.68.

(b) 0.1 N-ammonium acetate buffer solution of pH 4.6—10% solution of phenol in chloroform. The coefficient of distribution of the antibiotic in the system (b) and accordingly the location of the maximum activity in the distribution can be varied as desired on one hand by changing the pH value of the buffer solution and on the other hand by changing the phenol content of the organic phase.

(c) 200 parts by volume of benzyl alcohol—100 parts by volume of n-butanol—6 parts by volume of N-hydrochloric acid—300 parts by volume of water—60 parts by volume of aqueous sodium chloride solution saturated at 19° C.

(8) A useful method of enriching and/or separating the ferrimycins is electrophoresis carried out at as a high-voltage electrophoresis at 500–4000 volts. The counter-current method has proved especially advantageous; in this method the ferrimycins present as the cation are locally anchored by accurately compensating the forced movement produced by the electric field by causing electrolyte to flow in the opposite direction. Substances having a different electric mobility leave the separation apparatus at the ends of the two electrodes.

The following combination of the abovementioned enriching operations has proved especially advantageous in preparing substantially pure products: From the culture filtrate the ferrimycins are adsorbed on a buffered solution of ion-exchanger Amberlite IRC–50 which latter is then eluted with methanolic hydrochloric acid. The eluates are concentrated in vacuo at pH 5, whereby an aqueous concentrate of the ferrimycins is obtained which corresponds to about 1/100 of the volume of the culture solution; as described above under (5) this concentrate is distributed several times between a phenol+chloroform mixture on one hand and aqueous solutions of a varying pH on the other hand, whereby after freeze-drying a preparation is obtained whose specific activity is about 500 to 1000 times that of the lyophilized culture filtrate. When such a preparation is treated by one of the abovementioned methods (6), (7) or (8), substantially unitary preparations of the ferrimycins, preferably in the form of a salt thereof, are obtained.

As revealed by its paper-chromatographic examination the antibiotic ferrimycin consists of two main constituents, namely base A and base B. Base A can be resolved into its constituents A1 and A2 which are substantially separated from each other during the enriching process described, more especially in the partition chromatography on cellulose, or in the chromatography on an ion-exchanger resin, or in the counter-current distribution.

The two main constituents ferrimycins A and B are defined paper-chromatographically by a direct comparison of their $R_f$-values within the $R_f$-values of a number of known antibiotics (2—11) in the systems A–G. In the case of system H the fractional elution method is used; the relevant figures represent the distance in centimeters travelled by the antibiotics after 16 hours' chromatography. The antibiotics are defined bioautobiographically with *Staphylococcus aureus* or with *Bacillus subtilis*.

II = System butanol+butyl acetate+glacial acetic acid+water (100:30:13:143); 24 hours
III = II, but 60 hours.
1 = Crude product containing ferrimycins A and B
2 = Ferrimycin B
3 = Ferrimycin A
4 = Ferrimycin $A_1$
5 = Ferrimycin $A_2$

| System | 1a | 1b | 2 | 3 | 4 | 5 | 6 | 7 | 8 | 9 | 10 | 11 |
|---|---|---|---|---|---|---|---|---|---|---|---|---|
| A | 0 | 0 | 0 | 0 | 0 | 0 | 0 | 0 | 0 | 0.92 | 0.07 | 0 |
| B | 0.49 | 0.63 | 0.05 | 0.05 | 0.17 | 0.02 | 0.02 | 0.66 | 0.55 | 0.92 | 0.32 | 0.22 |
| C | 0.34 | 0.58 | 0.22 | 0 | 0.02 | 0.22 | 0.03 | 0.72 | 0.62 | 0.93 | 0.39 | 0.11 |
| D | 0.05 | 0.15 | 0 | 0 | 0 | 0 | 0 | x | x | 0.92 | | 0 |
| E | 0.32 | 0.32 | 0 | 0.10 | 0.22 | 0 | 0 | x | x | 0.86 | | 0.12 |
| F | 0.47 | 0.47 | 0.22 | 0.14 | 0.12 | 0.04 | 0.05 | 0.49 | 0.42 | 0.91 | 0.43 | 0.36 |
| G | 0.74 | 0.74 | 0.07 | | | 0.02 | | x | x | 0.94 | 0.61 | 0.69 |
| H | 2.7 | 7.6 | 0 | 0 | 0 | 0 | 0 | (14.5) | (8.8) | 27 | | 1 |

NOTE.—In the above table the letters and figures have the following meaning: A, butanol saturated with water; B, butanol plus glacial acetic acid plus water (4:1:5) (supernatant phase); C, butanol saturated with water plus 2% para-toluene sulfonic acid; D, butanol saturated with water plus 2% piperidine; E, butanol plus pyridine plus water (6:4:3); F, 80% ethanol plus 1.5% sodium chloride; Whatman paper No. 4 impregnated with 0.95-molar sodium sulfate plus 0.05 molar sodium hydrosulfate; G, butanol plus ethanol plus water (1:1:2); H, butanol plus butyl acetate plus glacial acetic acid plus water (10:3:1.3:14.3) (supernatant phase); 1a, Ferrimycin A; 1b, Ferrimycin B; 2, Streptomycin; 3, Ristocetin A; 4, Ristocetin B; 5, Neomycin B; 6, Viomycin; 7, Chlorotetracycline; 8, Oxytetracycline; 9, Actinomycin J; 10, Cycloserine; 11, Grisein; x, Antibiotic distributed over whole path of migration; ( ), position unsharp.

In the paper-electrophoresis in a 0.1-molar solution of acetate buffer of pH 4.6 the ferrimycins A and B migrate towards the cathode at a speed which is about half that of streptomycin.

Ferrimycin A—as obtained for example by electrophoresis or chromatography on an ion-exchanger or cellulose—is a reddish brown powder which is readily soluble in water, methanol, dimethyl formamide, benzyl alcohol, glacial acetic acid or a mixture of phenol and chloroform. The infra-red spectrum of the product is shown in FIGURE 1. The ultraviolet spectrum (in water) displays a maximum at 318 m$\mu$ $$(E^{1\%}_{1cm.} = 47.2)$$

and inflections at 229 m$\mu$ and 400 m$\mu$. The elementary analysis of the hydrochloride reveals the following values: C = 50.68%, H = 6.99%, N = 13.45%, Fe (grav.) = 3.55%, Fe (color) = 3.66%, Cl = 2.75%.

The physical and chemical properties of ferrimycin A1 and A2 differ only very slightly from one another; the relevant values of strongly enriched preparations, obtained by cellulose chromatography in an acetic acid butanol-water system, are summarized in the following table:

| | Ferrimycin | Ferrimycin |
|---|---|---|
| Analysis: | | |
| C | 47.63% | 48.77% |
| H | 6.72% | 6.65% |
| Fe | 4.88% | 4.82% |
| Equivalent weight | 1,078 | 984 |
| pK*$_{MCS}$ | 7.87 | 7.73 |
| Ultra-violet spectrum ($E^{1\%}_{1\,cm.}$) | 229 m$\mu$ (336) | 227 m$\mu$ (332) |
| | 319 m$\mu$ (37) | 319 m$\mu$ (37) |
| | 425 m$\mu$ (27.6) | 425 m$\mu$ (25) |

In FIGURE 5 are shown the ultra-violet spectra (in water: c. = 5×10$^{-3}$) of purified ferrimycin A (Graph 1, extinction $E = A$) and of the constituents ferrimycin $A_2$ (Graph 2, $E = A - 0.1$) and ferrimycin $A_1$ (Graph 3, $E = A - 0.2$).

Figure 4:
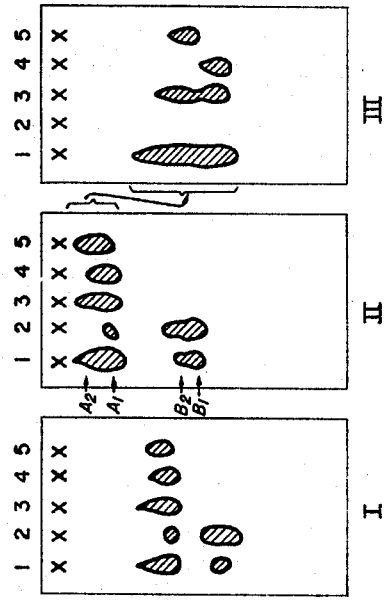

The paper-chromatographic behavior of the ferrimycins A, $A_1$, $A_2$ and B is shown in FIGURE 4. The products are identified bioautographically with *Staphylococcus aureus*. The figures used in the diagram have the following meanings:

I = System butanol+glacial acetic acid+water (4:1:5); 10 hours

When highly purified ferrimycin A preparations are chromatographed on a cellulose column with a mixture of tertiary butanol and hydrochloric acid containing sodium chloride, pure ferrimycins $A_1$ and $A_2$ are obtained in the form of the dihydrochlorides. Their properties are summarized in the table below:

| | Ferrimycin $A_1$ dihydrochloride | Ferrimycin $A_2$ dihydrochloride |
|---|---|---|
| Microanalysis | C 46.70%; 46.44% | C 45.78% |
| | H 6.79%; 6.77% | H 6.77% |
| | N 12.73%; 12.80% | N 12.75% |
| | Fe 5.27%; 5.34% | Fe 5.29% |
| | Cl 6.43%; 6.31% | Cl 6.23% |
| | (C)CH$_3$ 1.95%; 2.15% | (C)CH$_3$ 2.16% |

| Titration | pK*$_{MCS}$ | Equivalent weight | pK*$_{MCS}$ | Equivalent weight |
|---|---|---|---|---|
| Helv. 37, 1872 (1954) | (a) 4.11 (b) 7.92 (c) 11.4 | 1,129 | (a) 4.04 (b) 7.91 (c) 11.5 | 1,086 |

| Ultraviolet absorption | Max., m$\mu$ | $E^{1\%}_{1\,cm.}$ | Max., m$\mu$ | $E^{1\%}_{1\,cm.}$ |
|---|---|---|---|---|
| (H$_2$O) | 229 | 317 | 231 | 328 |
| | 319 | 28.3 | 319 | 30 |
| | 430 | 26.4 | 435 | 26.2 |

Figure 7:
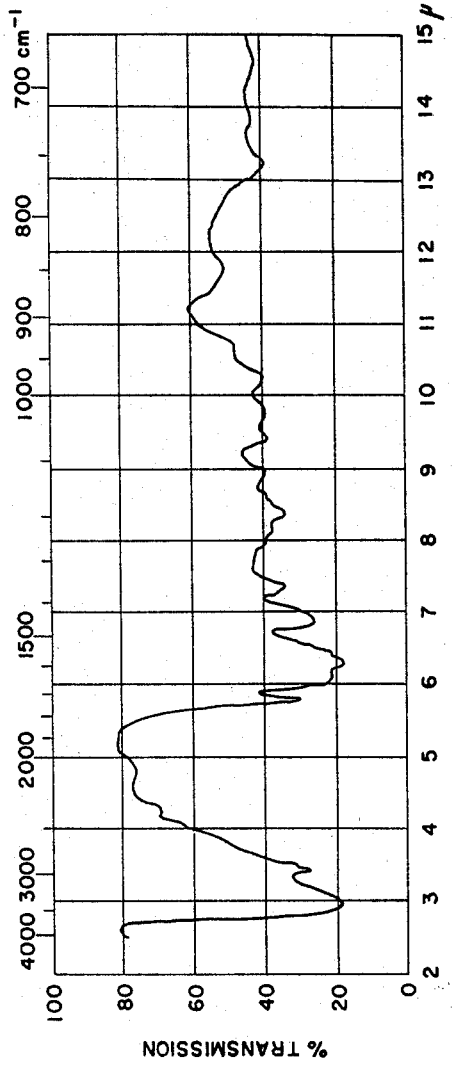
Figure 8:
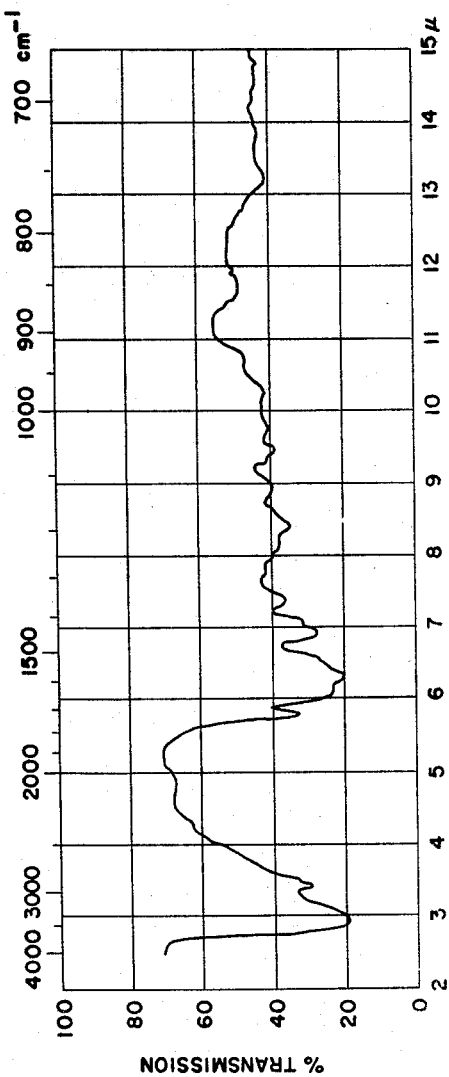

| Infrared absorption (KBr) | Cf. Fig. 7 | Cf. Fig. 8 |
|---|---|---|
| Craig's Distribution | Distribution coefficient at 25° C. in the system n-butanol-benzylalcohol/0.001 N HCl/saturated aqueous NaCl solution (10:5:15:3), 0.372. | Distribution coefficient at 25° C. in the system n-butanol-benzylalcohol 0.001 N HCl/saturated aqueous NaCl solution (10:5:15:3), 0.175. |
| Paper chromatography | Rf value in the system tertiary butanol/0.004 N HCl/saturated aqueous NaCl solution (2:1:1); Whatman No. 1 paper impregnated with acetone/H$_2$O/saturated aqueous NaCl solution (6:3:1), 0.59. | Rf value in the system tertiary butanol/0.004 N HCl/saturated aqueous NaCl solution (2:1:1); Whatman No. 1 paper impregnated with acetone/H$_2$O/saturated aqueous NaCl solution (6:3:1), 0.47. |

The dihydrochlorides of pure ferrimycins $A_1$ and $A_2$ have an antibiotic activity which is about 20,000 times that of the lyophilized culture filtrate.

The ferrimycin dihydrochlorides are very readily soluble in water, methanol, phenol of 90% strength, mixtures of phenol and chloroform, dimethylformamide and methyl Cellosolve, soluble to moderately soluble in glacial acetic acid, alcohol, benzyl alcohol and pyridine, and insoluble in butanol, chloroform, ethyl acetate and less polar solvents. They are precipitated in the form of amorphous salts from aqueous solutions with picric acid, ammonium reineckate and picrolonic acid. With ninhydrin a blue-violet coloration occurs when the dihydrochlorides are heated for a longer time in butanol containing pyridine. Color reactions according to Sakaguchi and Molisch and the anthrone test are negative. Neutral solutions of the ferrimycins do not react with potassium ferrocyanide, but weakly acidified solutions react spontaneously with the formation of Berlin blue. Berlin blue colorations occur also with ferricyanide-iron chloride reagent, whereas the addition of potassium ferricyanide alone produces no significant color reaction, and the addition of iron chloride alone produces a brown coloration. Red colored ferrimycin solutions change their color reversibly through violet-red to colorless when a strong mineral acid is added dropwise. When a 2 N-solution of sodium hyroxide is added, iron hydroxide is precipitated. When a concentrated methanolic solution of 8-hydroxyquinoline is reacted with an aqueous solution of a ferrimycin, dark-colored, crystalline precipitates of iron hydroxy-quinoline separate rapidly. The mother liquors, after being washed with chloroform, yield on evaporation iron-free ferrimycins in the form of almost colorless powders which are transformed back into the red-colored ferrimycins on the addition of ferric chloride. The ferrimycins react with sodium dithionite with decolorization. When the solution is allowed to stand in the air the original color returns.

When ferrimycin A is subjected to hydrolysis under acid conditions the following products can be identified inter alia: succinic acid, 1-amino-5-hydroxylamino-pentane, δ-aminovaleric acid, cadaverine and ammonia.

The free bases of the ferrimycins are readily accessible from their salts: from the sulfate, for example, by reaction in an aqueous medium with barium hydroxide, neutralizing the excess baryta with carbon dioxide, separating the precipitated barium carbonate and sulfate, and isolating the free base by means of freeze-drying. It is simpler however to prepare the free bases from the salts with the use of a strongly basic anion-exchanger, for example of the OH form of the product marketed under the trademark Dowex-2.

One of the most striking properties of the ferrimycins is their pronounced stability minimum between pH 6 and 9. At 20° C. and a pH of 7 and 8 the solutions lose within 48 hours most of their activity, whereas at the same temperature at a pH of 1–5 and 10–13 they remain extensively active.

The antibiotic activity of the ferrimycins is antagonised by the iron-containing growth-promoting substances, i.e. the ferrioxamines (Case 4377). In this respect the ferrimycins differ from all known antibiotics likewise produced by strains of the genus *Streptomyces lavendulae*.

The salts of the ferrimycins are derived from the known inorganic and organic acids, for example from hydrochloric, sulfuric, phosphoric, acetic, propionic, valeric, palmitic, oleic, succinic, citric, mandelic, glutamic or pentothenic acid. They are neutral or acid salts. They are prepared by the action of the appropriate acid on the free base or by double conversion of a salt, for example of ferrimycin sulfate with calcium pantothenate.

The ferrimycins develop a very strong antibiotic action towards a variety of test organisms. In the following table the activities of ferrimycins A, $A_1$ and $A_2$ are shown. The figures shown are the inhibiting zones expressed in millimeters which are obtained in the agar plate test with paper roundels of 6 mm. diameter impregnated with solutions of 0.1% strength:

| Test organism | Base A | Base A1 | Base A2 |
| --- | --- | --- | --- |
| Staph. aureus | 26 | 27 | 26.5 |
| Streptococcus faaecalis | 8 | 0 | 9 |
| Escherichia coli | 10.5 | 10.5 | 11 |
| Shigella sonnei | 13.5 | 14 | 14 |
| Pasteurella pestis | 12 | 12 | 12 |
| Bac. megatherium | 20 | 20 | 20 |
| Klebsiella, Type A | 23 | 22.5 | 22.5 |

The ferrimycins act also in vivo; thus, for example, when five subcutaneous doses of 0.1 mg./kg. of ferrimycin A, $A_1$ and $A_2$ are given to mice infected with *Staphylococcus pyogenes* var. *aureus*, 100% survivals are found, whereas for five doses of 0.05 mg./kg. 60% survivals are observed.

The ferrimycins are of low toxicity; thus, for example, mice tolerate a subcutaneous administration of 1000 mg./kg. without suffering injury. Higher doses have not yet been tested.

The antibiotic ferrimycin, its constituents A, $A_1$, $A_2$ and B, as well as their salts or derivatives can be used as medicaments, for example in the form of pharmaceutical preparations which contain said compounds in admixture with an organic or inorganic pharmaceutical excipient suitable for enteral, parenteral or local administration. Suitable excipients are substances that do not react with the new compounds such, for example, as gelatine, lactose, starches, magnesium stearate, talc, vegetable oils, benzyl alcohols, gums, polyalkylene glycols, white petroleum jelly, cholesterol or other known pharmaceutical vehicles. The pharmaceutical preparations may be, for example, tablets, dragees, powders, ointments, creams or suppositories, or in liquid form, solutions, suspensions or emulsions. They may be sterilized and/or may contain assistants such as preservatives, stabilizers, wetting agents or emulsifiers. They may also contain further therapeutically useful substances.

The following examples illustrate the invention without limiting its scope thereto.

*Example 1*

*Streptomyces lavendulae* A 21510 is grown as a submerged culture on a nutrient solution containing per liter of tap water 20 grams of rape shucks, 10 grams of glucose, 1 gram of calcium carbonate and 0.2 gram of secondary potassium phosphate. The nutrient solution is sterilized in the inoculation flasks or in the fermenters for 20–30 minutes under 1 atmosphere gauge. The sterilized nutrient solution has a pH value of 7.5 to 8.0. Inoculation is performed with up to 10% of a partially sporulating vegetative culture of the organisms. Incubation is performed wtih vigorous shaking or stirring at 27° C., cultures in fermenters being aerated with about 2 volumes of sterile air per volume of solution per minute. After an incubation period of 48–120 hours the culture solution has achieved its maximum inhibitive value towards the test organisms (*B. subtilis, B. megatherium, Micrococcus pyogenes* var. *aureus*). Incubation is discontinued, the pH is adjusted to 4.5 by adding dilute sulfuric acid, and the mycelium as well as other solid constituents are separated from the solution containing the bulk of the ferrimycins by filtration or centrifugation. Prior to its filtration the culture solution may be treated with about 1% of a filter assistant, for example Hyflo Supercel. The filter residues are washed with water and with aqueous methanol, and the washings are combined with the culture filtrate.

By using instead of the nutrient solution described above one which contains per liter of tap water the following nutrients, and the cultivation and working up are performed in identical manner, culture filtrates of a similarly high antibiotic activity are obtained:

|  | Grams |
|---|---|
| (a) Glucose | 10 |
| Soybean flour | 10 |
| Sodium nitrate | 1 |
| Sodium chloride | 5 |
| (b) Glycerol | 20 |
| Soybean flour | 10 |
| Sodium chloride | 5 |
| Sodium nitrate | 1 |
| Calcium carbonate | 10 |
| (c) Glucose | 10 |
| Soybean flour | 10 |
| Corn steep liquor | 20 |
| Sodium chloride | 5 |
| Sodium nitrate | 1 |
| Calcium carbonate | 10 |
| (d) Lactose | 20 |
| Distillers' solubles | 20 |
| Sodium chloride | 5 |
| Sodium nitrate | 1 |
| (e) Corn steep liquor | 20 |
| Malt extract | 20 |
| Sodium chloride | 5 |
| Secondary potassium phosphate | 0.2 |
| Calcium carbonate | 2 |

*Example 2*

3 liters of a culture filtrate prepared as described in Example 1 are adjusted to pH 7.5 by adding dilute sodium hydroxide solution and then treated with 50 grams of active carbon (Norit A). The mixture is mechanically stirred for one hour and the whole of the antibiotically active substance is adsorbed on the carbon. The latter is filtered off the completely inactive solution, advantageously with the aid of a small amount of filter assistant, such as Hyflo Supercel. The carbon is then added to 500 cc. of a mixture of 4 parts by volume of water and 1 part by volume of pyridine, the mixture is mechanically stirred for ½ hour and then filtered, and the carbon residue is extracted once more in the same manner. The eluate contain the whole antibiotic activity.

*Example 3*

3 liters of culture filtrate prepared as described in Example 1 are adjusted to pH 7.5 by adding dilute sodium hydroxide solution and immediately precolated at a rate of 0.5 liter per hour through a column of Amberlite IRC-50 (H-form) of 30 cm. length and 5 cm. diameter, whereby the entire antibiotic activity is adsorbed. The column is flushed with 3 liters of water and eluted with 1 liter of 0.4 N-hydrochloric acid. The first 500 cc. of the eluate are antibiotically inactive, whereas the following 500 cc. contain the whole activity. To remove the excess of hydrochloric acid from this active eluate it is percolated through a column of Amberlite IR-4B. Freeze-drying of the percolate yields an enriched ferrimycin preparation in the form of an amorphous powder.

*Example 4*

6 liters of a culture filtrate prepared as described in Example 1 are adjusted to pH 7.5 by adding dilute sodium hydroxide solution and immediately percolated through a column of Asmit 173 of 14 cm. length and 4.5 cm. diameter, whereby the antibiotic is completely adsorbed. The adsorber resin is then flushed with 3 liters of water and the antibiotic is eluted with 1 liter of a 1:1 mixture of methanol and N-acetic acid. The eluate, which contains the whole activity, is concentrated in vacuo at 35° C. to 15 cc. This concentrate is treated with 75 cc. of 0.25 N-methanolic hydrochloric acid and the mixture is poured into 10 liters of acetone, whereupon the hydrochloride of the antibiotic precipitates; it is filtered off and washed with acetone. For further purification it is dissolved in 150 cc. of methanol and the slightly turbid solution is filtered with the aid of Celite. Evaporation of the filtrate in vacuo at 25° C. yields the ferrimycin hydrochloride in the form of an amorphous powder.

*Example 5*

30 liters of a culture filtrate prepared as described in Example 1 are adjusted to pH 4.5 and then concentrated in a film-still to a volume of 2 liters. The concentrate is adjusted to pH 8 by adding dilute sodium hydroxide solution and then filtered with the aid of Celite. The clear filtrate is adjusted to pH 5 and 1.5 liters of a hot aqueous picric acid solution of 5% strength are stirred in. The whole is maintained for several hours at 0° C. and the precipitate formed is filtered off with the addition of 50 grams of Celite. The antibiotic activity of the filtrate is very weak. The filter residue is then stirred three times with 800 cc. of cold acetone on each occasion and filtered. The filtrate is concentrated in vacuo to 80 cc., whereupon the picrate of the antibiotic and the excess of picric acid precipitate. After filtration, 8.5 grams of dry substance are obtained.

To isolate the ferrimycins in the form of the hydrochloride 2.5 grams of the aforementioned dry substance are dissolved in 30 cc. of methanol, and the solution is treated with a mixture of 1 cc. of concentrated hydrochloric acid and 10 cc. of acetone and then with 500 cc. of ether, whereupon the hydrochloride precipitates quantitatively. The last remnants of picric acid can be removed from the precipitate by dissolving it repeatedly in hydrochloric methanol and reprecipitating it with ether. Finally, the hydrochloride is dissolved in a minimum of methanol and the solution is filtered and evaporated in vauco, to yield 714 mg. of an enriched ferrimycin preparation which has a very strong antibiotic action.

*Example 6*

600 liters of a culture filtrate prepared as described in Example 1 are stirred with 5.5 kilograms of Hyflo Supercel, then adjusted with 2.5 liters of 2 N-hydrochloric acid to a pH-value of 4.0 and filtered. The filter residue is washed with 100 liters of water. The clear filtrate is stirred for 45 minutes with 7 kilograms of pretreated Norit. (The pretreatment of Norit consists in stirring it repeatedly with N-hydrochloric acid and then washing with water until it is neutral.) The Norit charged with antibiotic is filtered off. The filtrate contains no antibiotic activity. The Norit adsorbate is washed twice with 200 liters of water by stirring and filtration. The washings contain no activity. Elution is performed by stirring the active carbon twice for one hour with a mixture of n-butanol+methanol+glacial acetic acid+water (2:1:1:2 parts by volume), the active carbon being filtered off. The combined eluates (140 liters+46 liters) are intimately mixed with 96 liters of n-butyl acetate. The separating aqueous phase is isolated and the organic phase is washed with 1.2 liters of water. The combined aqueous phases (65.5 liters) are successively washed with 72 liters of a mixture of n-butanol+n-butyl acetate (1:2 parts by volume), 48 liters of ethyl acetate and finally with 24 liters of ether by stirring. The organic phases are discarded. The remaining aqueous phase (44 liters), which contains the whole antibiotic activity, is concentrated, at a maximum temperature of 30° to a volume of 5.45 liters. From this highly active, brown concentrate the antibiotic is obtained by freeze-drying in the form of 509 grams of a brown powder whose specific antibiotic activity is 30–50 times that of the culture filtrate.

*Example 7*

To isolate the ferrimycins from 300 liters of a culture filtrate prepared as described in Example 1, 1 part by volume of Amberlite IRC-50 in the H-form is mechanically mixed with 2 parts by volume of Amberlite IRC-50 in the Na-form. 6.3 liters of this mixture are introduced into a glass column. The ratio height:diameter of the resin bed is 8:1. The culture filtrate is adjusted with 2 N- hydrochloric acid to pH 4.0 and percolated through the resin at a rate of 0.2 liter per minute per liter resin, whereupon an orange-brown zone develops in the upper two-thirds of the column. The resin is then washed with 30 liters of water and with 60 liters of methanol of 80% strength. The percolate and the washings contain only little antibiotic activity. Elution is carried out in two portions with a total of 37 liters of a mixture of 8 parts by volume of methanol and 2 parts by volume of N-hydrochloric acid. The two portions are adjusted with 5 N-sodium hydroxide solution to pH 5.0 combined, and then concentrated in a rotary evaporator at a maximum temperature of 30° C. to 2 liters. The pH value of the aqueous concentrate is adjusted to 5.6 and the material is filtered through Hyflo Supercel to remove a small amount of insoluble material. This filtrate (2.3 liters) contains almost the whole of the antibiotic activity of the culture solution. It is extracted in 4 portions with a total of 500 cc. of a mixture containing 100 grams of phenol in 100 cc. of chloroform. The aqueous phase is discarded. The phenol+chloroform extract (500 cc.) is diluted with 1 liter of chloroform and shaken with 3 x 500 cc. of 0.1 N-ammonium acetate buffer solution of pH 4.60, whereby colored antibiotically inactive impurities are extracted from the organic phase. The chloroform phase is then extracted with 300+2 x 100 cc. of 0.1 N-hydrochloric acid. The deep red acid extract, which contains the antibiotic, is adjusted with potassium bicarbonate to pH 3.5 and back-extracted with 4 x 50 cc. of a phenol+chloroform mixture (100 g.:100 cc.). The phenol+chloroform extract is filtered through Celite. The clear red filtrate (200 cc.) is treated with vigorous shaking with 50 cc. of water, 500 cc. of ether and 300 cc. of petroleum ether. The aqueous phase is separated and the organic phase washed with 2 x 50 cc. of water. The combined aqueous extracts are shaken twice with 500 cc of ether and once with 500 cc. of benzene and then lyophilized. There are obtained 2.60 grams of an orange-brown powder having a high antibiotic activity. The specific antibiotic activity (activity per unit weight of dry substance) is 500–1000 times that of the starting material. When this material is subjected to bioautographic development with Staphylococcus aureus on Whatman paper No. 1 in the system n-butanol:n-butyl-acetate:glacial acetic acid:water 10:3:1:3:14.3, two stains appear: the antibiotic substance which travels more slowly is designated as Base A and the substance which travels 2.5 times faster as Base B. When Base A is sprayed with ferric chloride+potassium ferricyanide on paper it gives a blue color reaction.

*Example 8*

A solution of 338 grams of an antibiotic preparation obtained as described in Example 6 in 1.5 liters of water is treated with 150 grams of crystalline ammonium sulfate and the solution is extracted with 1 liter and 2 x 500 cc. of a mixture containing 100 grams of phenol in 100 cc. of chloroform. The combined phenol+chloroform extracts are shaken with 750 cc. of N-hydrochloric acid and then filtered through a layer of Celite. While being stirred, the clear reddish brown filtrate is treated with 600 cc. of water, 4 liters of ether and finally with 4 liters of petroleum ether. The aqueous phase is separated and the organic phase is further extracted with twice 200 cc. of water. The combined aqueous phases (1 liter) are washed with twice 1 liter of ether and then lyophilized, to yield 136 grams of a brown powder whose specific antibiotic activity is twice that of the starting material.

*Example 9*

550 mg. of a highly active antibiotic preparation obtained as described in Example 7 are dissolved in 55 cc. of an 0.1 N-ammonium acetate buffer solution of pH 4.60 and extracted 4 times with 20 cc. of a mixture containing 100 grams of phenol in 400 cc. of chloroform. The organic extracts are washed back twice with 15 cc. of buffer solution. The organic extract (80 cc.) which contains the antibiotic is diluted with 40 cc. of chloroform, once more washed with 60 cc. of buffer solution and then filtered through a double folded filter. The deep red filtrate is extracted with 30+20+10 cc. of 0.2 N-hydrochloric acid. The acid solution containing the antibiotic is diluted with 50 cc. of water and exhaustively extracted with a mixture containing 100 grams of phenol in 100 cc. of chloroform (2 x 20+10 cc.). The combined phenol+chloroform extracts are filtered through a double folded filter and shaken with 20 cc. of water, 200 cc. of ether and 100 cc. of petroleum ether. The aqueous phase is separated and the organic phase further extracted twice with 15 cc. of water. The combined aqueous extracts are washed twice with 50 cc. of ether and once with 50 cc. of benzene and then lyophilized to yield 117 mg. of a brownish red powder whose antibiotic activity is approximately 5 times that of the starting material.

*Example 10*

700 mg. of a ferrimycin preparation obtained as described in Example 7 are chromatographed on 127 grams of Whatman cellulose powder No. 1. The elution is performed with the supernatant phase of a mixture of 4 parts of butanol, 1 part of glacial acetic acid and 5 parts of water. The supernatant phase is separated and treated with 10% by volume of pure butanol. The substance is pasted with 10 times its own weight of cellulose powder and in the form of a powder placed on the column. The percolation rate is 16–20 cc. per hour. Fractions of 40 cc. each are collected. The individual fractions are shaken with 50 cc. of petroleum ether. The separated aqueous phase is washed with benzene and lyophilized. The bulk of the antibiotic activity is found in fractions 7–8 (121 mg.) and 10–13 (142 mg.). As revealed by paper-chromatographic examinations the fractions 7–8 contain predominantly ferrimycin B, while fractions 10–13 contain predominantly ferrimycin A.

*Example 11*

3 grams of a ferrimycin preparation obtained as described in Example 8 are distributed over 100 stages in a Craig distribution apparatus in the system sec. butanol/0.1 N-ammonium acetate buffer solution of pH 4.68. Each stage contains 100 cc. each of supernatant phase and bottom phase. The substance is introduced into unit No. 3. Working up consists in treating the mixture of the two phases with twice the volume of petroleum ether and lyophilizing the aqueous phase. The dark-colored fractions 3–11 contain only little antibiotic activity. The orange-yellow fractions 12–20 (631 mg.) contain the bulk of the antibiotic activity (mainly ferrimycin A). The yellow fractions 21–40 are less active and contain a mixture of ferrimycins A and B in which the latter predominates.

*Example 12*

200 mg. of a ferrimycin A preparation obtained as described in Example 10 are distributed over 29 stages in a Craig distribution apparatus in the system 0.05 N-ammonium acetate buffer solution of pH 4.58/10% phenol in chloroform. Each stage contains 10 cc. each of supernatant phase and bottom phase. The bulk of the antibiotic activity is found in fractions 6–15 which are combined (about 200 cc.), treated with 400 cc. of ether and 300 cc. of petroleum ether, and shaken. The orange-red aqueous phase is separated, washed with chloroform and then extracted with 20 cc.+3 x 10 cc. of a mixture of 100 grams of phenol in a 100 cc. of chloroform. While shaking the phenol+chloroform extract it is mixed with 20 cc. of water, 300 cc. of ether and 200 cc. of petroleum ether. The red aqueous phase is separated, washed with much ether and benzene, and lyophilized, to yield 86.4 mg. of ferrimycin A in the form of a yellow-water-soluble powder. Ultra-violet spectrum in water:

$\lambda_{max}$. 215 m$\mu$ ($E_{1\ cm.}^{1\%}$=312), 315 m$\mu$ ($E_{1\ cm.}^{1\%}$=42)

Color reactions: Ferric chloride brownish red; ferric chloride+potassium ferricyanide: blue; ninhydrin weakly positive; negative: Sakaguchi, Maltol, Elson-Morgan.

Example 13

30 liters of an aqueous eluate concentrate, prepared according to Example 7 by elution of ferrimycin from Amberlite IRC-50 and subsequent expulsion of the methanol in vacuo, is treated with stirring with 1 kg. of Hyflo and within 2 hours with 1.8 liters of a mixture of 11 parts of phenol and 1 part of water. The whole is then stirred on for ½ hour and suction-filtered. The filtrate which contains about 2–5% of the activity is discarded. The filter cake is thoroughly expressed and then stirred twice with 4 liters each of ether and once with a mixture of 8 liters of acetone with 2 liters of ether, and in each case suction-filtered, the residue then being washed successively on the filter with 5 liters each of acetone and 4 liters of chloroform. All washings are practically inactive. While still moist with chloroform, the filter cake is stirred into 3 liters of a mixture of phenol and chloroform (1 part by weight to 1 part by volume) and stirred for one hour. 15 liters of chloroform are then run in in the form of an even current within one hour. The Hyflo is suctioned off and washed twice with 2 liters of phenol+chloroform 1:11 (weight/volume) and once with 2 liters of chloroform. The residue still contains 5–10% of the activity.

The combined active filtrates (22 liters) are concentrated at 25° C. to 4 liters, and the concentrate is added dropwise within 30 minutes to a mixture of 4 liters of ether, 8 liters of petroleum ether and 400 grams of Hyflo. After another 30 minutes the mixture is suction-filtered, and the filter cake is washed with 2 liters of ether and twice with 1 liter of acetone. All filtrates contain only traces of activity.

The filter cake is stirred three times for 10 minutes with 1.5 liters of methanol on each occasion, suctioned off and finally washed on the filter with 0.5 liter of methanol. The washed Hyflo no longer contains any activity.

The dark brown filtrates (4–4.5 liters) are cautiously evaporated to dryness at 20–30° C. in a water-jet vacuum. The still tacky residue is dried in a high vacuum for 20 hours, to yield 75–88 grams of a reddish brown, very active ferrimycin preparation. The yield of activity amounts to 90% calculated on the starting material.

Example 14

6 grams of a ferrimycin preparation obtained as described in Example 13, whose antibiotic activity is about 1000 times that of the lyophilized culture filtrate and which contains both ferrimycin A and ferrimycin B, is subjected to a counter-current distribution according to Craig over 115 stages. The apparatus comprises 120 units. Each unit is charged with 100 cc. of supernatant phase and 100 cc. of bottom phase of a mixture, equilibrated at 19° C., of benzyl alcohol (200 parts by volume), n-butanol (100 parts by volume), N-hydrochloric acid (6 parts by volume), water (200 parts by volume) and 60 parts by volume of aqueous sodium chloride solution saturated at 19° C. The first two units contain only solvent. 2 grams of substance each are introduced into the following three units and then distributed 115 times at 19° C. The number of shaking movements per distribution is 30, and each rest interval is 15 minutes.

On completion of the distribution the 118 fractions so obtained are kept at −10° C. For testing, 10 cc. each of supernatant phase and bottom phase are taken from every third fraction and shaken with 50 cc. of petroleum ether. The separated aqueous phase (10 cc.), which now contains the whole of the hydrophilic material, is freed from any adhering organic solvents by a short evacuation. The test solutions prepared in this manner are used on one hand for the colorimetric evaluation (extinction at 425 m$\mu$ in 1 cm. bulbs; see FIG. 6, Graph 1), and on the other hand for the color reaction with ninhydrin. For the latter reaction 0.5 cc. of test solution and 0.5 cc. of ninhydrin reagent—prepared as described by S. Moore and W. H. Stain, J. Biol. Chem. 211, page 907 [1954]— are mixed together, heated for 15 minutes at 100° C., diluted with 5 cc. of a 1:1 mixture of alcohol and water and then measured in spectrophotometer at 570 m$\mu$ (Graph 2). For the biological tests the test solutions are diluted at a ratio of 1:50. Graph 3 shows the activity referred to an arbitrary standard, determined in the plate diffusion test, towards *Staphylococcus aureus* in vitro. As can be shown by their paper-chromatograms the active fractions 40–70 contain ferrimycin A, while ferrimycin B is present in fractions 75–100. A substantial enrichment can be achieved. The antibiotically active fractions 25–39, 40–48, 49–55, 56–70 and 71–95 are combined and shaken with an equal volume of petroleum ether, whereby the red, active substances are transferred into the aqueous phases from which they are isolated with phenol+chloroform as described in Example 12. The amounts thus obtained, the enrichment achieved compared with the starting material, as well as the yields of antibiotic activity obtained are summarized in the following table:

| Fraction | Amount in mg. | Enrichment factor | Yield of activity, percent | Ferrimycin |
|---|---|---|---|---|
| 25–39 | 429 | 0.55 | 4.6 | |
| 40–48 | 254 | 4.77 | 20.4 | |
| 49–55 | 211 | 9.22 | 32.8 | A |
| 56–70 | 257 | 3.49 | 15.1 | |
| 71–95 | 938 | 1.72 | 27.2 | B |

Example 15

2 grams of a ferrimycin A preparation (fractions 49–55) which has been obtained as described in Example 14 and whose antibiotic activity is about 9000 times that of the lyophilized culture filtrate, are chromatographed on a 70 cm. x 7.14 cc. column of a strongly acidic ion-exchanger Dowex-50 WX$_2$ (100/200 mesh). (The ion-exchanger has first been purified according to Hirs et al., J. Biol. Chem. 219, page 623 [1956], converted into the ammonium-form and then equilibrated for 3 days with a 0.2-molar ammonium acetate buffer solution of pH 4.50 at 17° C. at a percolation rate of 100 cc. per hour.) The substance is then dissolved in 20 cc. of buffer solution, carefully placed on the column and then eluted with the same buffer solution at the same percolation rate. After having performed the elution for 20 hours, the operation is switched over to gradient elution in which the 0.2-molar ammonium acetate buffer solution entering the column is continuously concentrated in a mixing chamber of 1 liter capacity by introducing an equivalent flow of 2-molar ammonium acetate buffer solution of pH 4.50, whereby its elution efficiency is continuously increased. The eluate is collected in fractions of 40 cc. each in an automatic fraction collector. The chromatogram is evaluated by measuring the extinction at 425 m$\mu$, paper-chromatography and biological tests. The fractions combined according to this evaluation are then worked up with phenol+chloroform in the manner described above. Fractions 195–216 yield 44 mg. of ferrimycin A whose antibiotic activity is about 16,000 times that of the lyophilized culture filtrate; it forms a brownish red powder.

Micro-analysis: C, 48.65%; H, 7.09%; N, 12.55%; Fe, 4.56%; Cl, 6.10%; (C)CH$_3$, 1.99%; (Roth-Kulm); Amino-N, 2.33% (Van Slyke).

Titration: $pK_{MCS}$ (Helv. 37, page 1872 [1954]), 4.18; 7.88; equivalent weight, 1106.
Absorption spectrum:

$$\lambda_{max}\ 228\ m\mu,\ E^{1\%}_{1\ cm.}\ 282$$
$$\lambda_{max}\ 219\ m\mu,\ E^{1\%}_{1\ cm.}\ 28.2$$
$$\lambda_{max}\ 425\ m\mu,\ E^{1\%}_{1\ cm.}\ 22.6$$

"Reduction value" according to C. S. Hanes, Biochem. J. 23, page 99, [1929]: 1.7 cc. 0.01 N-sodiumthiosulfate solution.

Combined hydroxylamine according to T. Emery and J. B. Neilands, Nature 184, page 1632 [1959]: 0.83 mol of $NH_2OH$ per atom of Fe.

Hydrolysis with 6 N-HCl for 14 hours at 110° C.: identified or isolated products: ammonia, cadaverine, 1-amino-5-hydroxylaminopentane, δ-amino valeric acid, proline, succinic acid, crystalline substance $$(C_7H_8O_3N.HCl)$$

with $\lambda_{max}$ 227 and 323 m$\mu$, as well as traces of further ninhydrin-positive substances and ferric chloride.

From fractions 115–145 of the chromatogram there can be further isolated 135 mg. of a mixture of substances of violet red color containing vitamin $B_{12}$. The remainder of the material tested appears as a brown band in the starting area of the chromatogram and is not eluted under the conditions described above.

*Example 16*

Portions of 8 grams each of an enriched ferrimycin preparation (main constituent A; activity 2000–3000 times that of the lyophilized culture filtrate; prepared, for example, as described in Example 10 of Indian patent application No. 64,825 (Case 4087/E) are subjected in a vertical glass column of 1 meter length and 6 cm. diameter, equipped with a cooling jacket and filled with cellulose powder, to zone electrophoresis according to J. Porath (Biochimica et Biophysica Acta 22, page 151 [1956]). ⅓ N-acetic acid is used as electrolyte solution. The substance is dissolved in 160 cc. of water and the brownish red solution poured over the column from the top anode end. At a voltage of 1000 volts and a current intensity of 100 milliamperes the orange-colored antibiotic zone, which is about 20 cm. wide, migrates towards the cathode at a rate of 3.3 cm. per hour. To assist the separating effect of the column, this electric movement is accurately compensated by electrolyte flowing in the opposite direction at 81 cc. per hour, so that the antibiotic is locally anchored in the column. Brownish, inactive accompanying substances of a superior electric migration velocity than the antibiotic are transferred into the cathode or anode chamber respectively and flushed out of it either continuously or intermittently. After an electrophoresis period of 5 to 6 days the antibiotic has travelled through a liquid column of 4–5 meters' length. The substances present on the column are then eluted with electrolyte solution and the eluate fractions obtained in the automatic fraction collector are subjected to biological tests. The deep red biologically active fractions are combined (1.5 liters). The antibiotic can be extracted from the acetic acid solution by adding 75 cc. of saturated aqueous sodium chloride solution with 250 cc. of a mixture of 1 gram of phenol:1 cc. of chloroform. After having filtered the extract through Celite, the antibiotic is precipitated with 1 liter of ether and 500 cc. of petroleum ether on 16 grams of Hyflo Supercel in the form of an orange-colored substance. The mixture containing the precipitate and the filter assistant is thoroughly washed with acetone and finally extracted with a small amount of cold methanol. From the methanol extract acetone precipitates ferrimycin A as an orange-colored powder. After having been dried at room temperature for 2 days under a pressure of 0.001 mm. Hg, the product contains about 100% of the test activity 4–6 times enriched. *Analysis*: C=50.68%; H=6.99%; N=13.45%; Fe (grav.)=3.55%; Fe (color.)=3.66%; Cl=2.75%.

Loss by drying at 120° C. under 0.01 mm. Hg: 2.46%. Infra-red spectrum in potassium bromide: see FIG. 1. Ultra-violet spectrum in water: maximum at 318 m$\mu$ $$(E^{1\%}_{1\ cm.}\ 47.2)$$

inflections at 229 m$\mu$ and 400 m$\mu$.

Solubility: very good in water, methanol and phenol+chloroform mixtures; soluble in dimethyl formamide, methyl Cellosolve, benzyl alcohol and glacial acetic acid; sparingly soluble in ethanol and practically insoluble in pyridine, propanol, butanol and the usual organic solvents, more especially in the lipoid solvents.

Precipitation reactions: can be precipitated from an aqueous solution with picric acid, picrolonic acid and ammonium reineckate.

Color reactions: orange-colored aqueous solutions reversibly turn via claret to pale yellow on addition of mineral acid. Addition of sodium hydroxide solution likewise results in decolorization. Neutral solutions do not react with potassium ferrocyanide. Acidified solutions give color reactions or precipitations of Berlin blue. Thus, iron bound in complex union in the trivalent state is liberated when the pH value is lowered.

Addition of ferric chloride produces a claret coloration, while an addition of ferric chloride+potassium ferricyanide produces a blue coloration. The following tests are negative: Molisch, anthrone, Folin-Ciocalteu, Sakaguchi. The ninhydrin reaction in butanol+pyridine becomes weakly positive only after prolonged heating. Hydrolysis with 6 N-hydrochloric acid yields a mixture of about 15 substances which are identifiable in the paper-chromatogram, of which some give a positive ninhydrin reaction.

*Iron-free ferrimycin A.*—A solution of 100 mg. of the resulting purified ferrimycin A in 1 cc. of methanol is treated with 334 mg. of 8-hydroxyquinoline in 2 cc. of methanol and kept for 8 hours at room temperature. The mixture is kept for another 15 hours at 0° C. and the precipitated blackish green crystals of 8-hydroxyquinoline iron are separated. The solution is diluted with a small amount of water and thoroughly agitated with chloroform and benzene to remove the excess of hydroxyquinoline. The residual pale-yellow aqueous phase, which contains the iron-free antibiotic, is lyophilized to yield 90 mg. of a biege-colored powder. In the ultra-violet range the iron-free antibiotic displays the same absorption spectrum as the starting material, but in the visible range the flat band at 400–430 m$\mu$ is absent. The product contains only ⅓ of the activity in vitro of the starting material. When ferric chloride is added to a colorless solution of the iron-free antibiotic, it turns spontaneously deep red, and the iron absorption at 400–430 m$\mu$ appears again in the spectrum and the specific antibiotic activity is increased.

*Example 17*

800 mg. of a ferrimycin A preparation obtained as described in Example 16 are chromatographed on a cellulose column of 3 x 65 cm. (195 grams) at 12° C. The elution medium used is the organic phase of an equilibrated mixture of 0.5 N glacial acetic acid with n-butanol (1:1) with the addition of 5 vol. percent of n-butanol. The fractions (30–40 cc. each) obtained in the automatic fraction collector are examined biologically, spectroscopically and by paper-chromatography. Fractions 60–104 contain 191 mg. of ferrimycin $A_1$, while fractions 105–200 contain 92 mg. of ferrimycin $A_2$. The suitably combined fractions are shaken with an equal volume of petroleum ether and with about 10 percent by volume of water, whereby the antibiotics are transferred into the aqueous phases from which they are isolated with phenol+chloroform as described in Example 16 in the form of orange powders. After having been dried for 3 days at 20° C. under 0.001 mm. Hg the preparations reveal the following data:

Ferrimycin $A_1$: Analysis: C=47.53%; H=6.72%; Fe=4.88%; titration in 80% methyl Cellosolve; equivalent weight: 1078; pK*$_{MCS}$ 7.87. Ultra-violet spectrum $\lambda_{max}$ 229 m$\mu$ ($E_{1cm.}^{1\%}$=336), 319 m$\mu$ ($E_{1cm.}^{1\%}$=37) and 425 m$\mu$ ($E_{1cm.}^{1\%}$=27.6)

Figure 2:
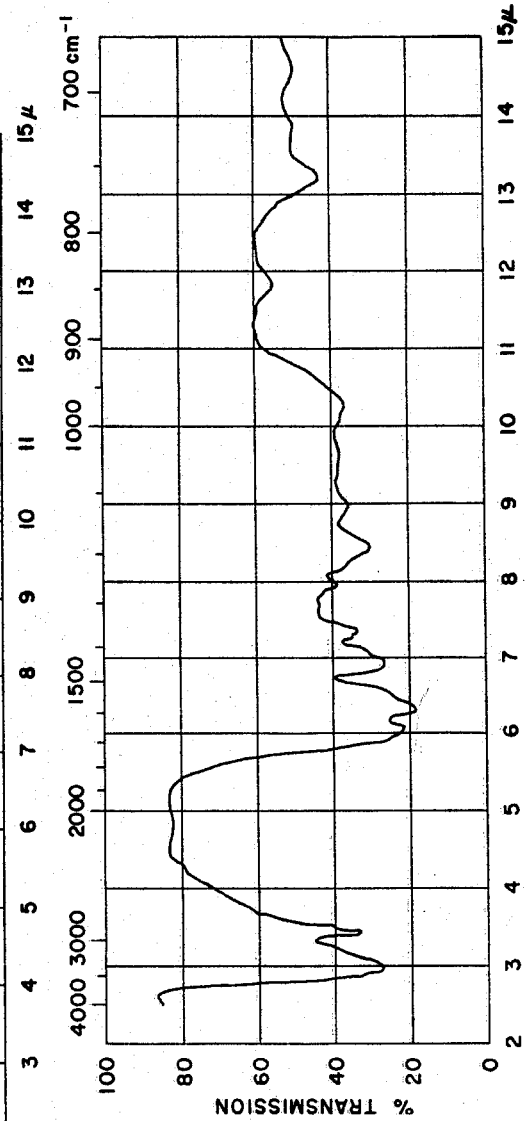

Infra-red spectrum in potassium bromide: see FIG. 2.

Ferrimycin $A_2$: Analysis: C=48.77%; H=6.65%; Fe=4.82%; titration in 80% methyl Cellosolve; equivalent weight: 984; pK*$_{MCS}$ 7.73. Ultra-violet spectrum $\lambda_{max}$ 227 m$\mu$ ($E_{1cm.}^{1\%}$=332), 319 m$\mu$ ($E_{1cm.}^{1\%}$=37) and 425 m$\mu$ ($E_{1cm.}^{1\%}$=25)

Figure 3:
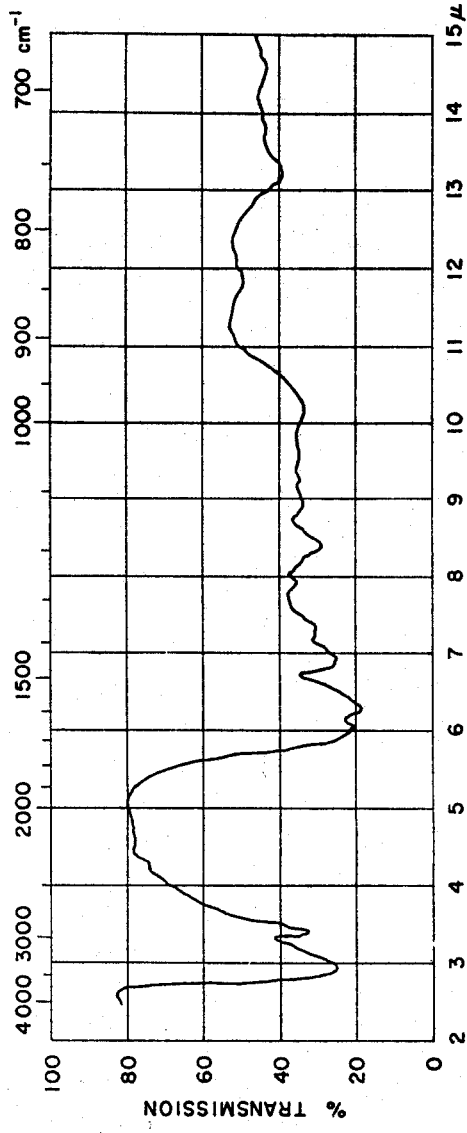

Infra-red spectrum (in potassium bromide): see FIG. 3. The paper chromatograms of various enriched and purified ferrimycin preparations on Whatman paper No. 1 are shown in FIG. 4. The identification is carried out bioautographically with *Staphylococcus aureus*. The figures signify:

I: system butanol/blacial acetic acid/water 4:1:5; 10 hours.
II: system butanol/butyl acetate/glacial acetic acid/water 100:30:13:143; 24 hours.
III: system butanol/butyl acetate/glacial acetic acid/water 100:30:13:143; 60 hours.
1: Antibiotic ferrimycin, Bases A+B, according to our U.S. patent application Serial No. 826,431, filed July 13, 1959, Example 7 (1 $\mu$g.).
2: Antibiotic ferrimycin B, according to our U.S. patent application Serial No. 826,431, filed July 13, 1959, Example 10 (5 $\mu$g.).
3: Antibiotic ferrimycin A, according to Example 1 of the present application (0.1 $\mu$g.).
4: Antibiotic ferrimycin $A_1$, according to Example 2 of the present application (0.05 $\mu$g.).
5: Antibiotic ferrimycin $A_2$, according to Example 2 of the present application (0.05 $\mu$g.).

*Example 18*

4 grams of ferrimycin A, obtained as described in Example 15, are subjected to zone electrophoresis (without countercurrent) in 0.33 N-acetic acid using the apparatus described in Example 16. After 21 hours at 100 milliamperes and 1000 volts, ferrimycin is in a zone which is 35 cm. wide the front being 74 cm. from the starting point. Elution with acetic acid and customary working up with a mixture of phenol and chloroform yield 3.21 grams of ferrimycin A which is more active by the factor 1.3.

*Example 19*

400 mg. of ferrimycin A, obtained as described in Example 18, are chromatographed on a column (87 cm. x 23.8 sq. cm.) filled dry with 830 grams of Whatman cellulose powder. In order to prepare the chromotogram there is first run through the column in the course of 70 hours 5.3 liters of a mixture of methanol, water and saturated aqueous sodium chloride solution (5:2:3), and then within 70 hours 3 liters of the organic phase of a mixture of tertiary butanol, 0.02 N-hydrochloric acid and saturated sodium chloride solution (2:1:1). The column is then equilibrated for 6 days at a percolation rate of 30 ml. per hour with the organic phase of a mixture of tertiary butanol, 0.001 N-hydrochloric acid and saturated aqueous sodium chloride solution (2:1:1) serving as fluxing agent. The substance is triturated in a mortar with 5 grams of washed cellulose powder and 30 ml. of fluxing agent to form a homogeneous magma which is put on the column. In the course of the chromatogram (75 hours) 3 colored zones develop. Shortly before the first zone emerges, the collection of the eluate in fractions of 10 ml. in an automatic fraction-receptacle is begun.

Advance zone: fractions Nos. 20-37; main zone: fractions Nos. 38-65; rear zone: fractions Nos. 75-95. The combined eluate fractions are agitated with 10% by volume of water and the same volume of ether. From the aqueous phases the deep red colored substances are extracted with a mixture of phenol and chloroform (1:1), the extracts washed thoroughly with 0.01 N-hydrochloric acid containing 10% of sodium chloride, the extracts dried by being passed through Celite and the substances precipitated on to Hyflo Supercel from the dry extracts by the addition of ether-petroleum ether while stirring well at a low temperature. The substances precipitated onto the Hyflo Supercel are thoroughly washed with ether by stirring and suction-filtering and then eluted with a little methanol. The methanolic solutions are cautiously evaporated to dryness in vacuo. From the advance zone (20-37) there are thus obtained 37 mg. of a mixture of ferrimycin $A_1$ and an inactive by-product, from the main zone (38-65) 291 mg. of pure ferrimycin $A_1$ dihydrochloride and from the rear zone 5 mg. of pure ferrimycin $A_2$ dihydrochloride in the form of brown-red powders. For the purpose of analysis drying is carried on over phosphorus pentoxide/potassium hydroxide for 50 hours at 25° C. under 0.001 mm. pressure of mercury. The data obtained are summarized in the table below.

| | Ferrimycin $A_1$ dihydrochloride | Ferrimycin $A_2$ dihydrochloride |
|---|---|---|
| Microanalysis | C 46.70%; 46.44% <br> H 6.79%; 6.77% <br> N 12.73%; 12.80% <br> Fe 5.27%; 5.34% <br> Cl 6.43%; 6.31% <br> (C)CH$_3$ 1.95%; 2.15% | C 45.78%. <br> H 6.77%. <br> N 12.75%. <br> Fe 5.29%. <br> Cl 6.23%. <br> (C)CH$_3$ 2.16%. |

| Titration | pK*$_{MCS}$ | Equivalent weight | pK*$_{MCS}$ | Equivalent weight |
|---|---|---|---|---|
| Helv. 37, 1872 (1954) | (a) 4.11 <br> (b) 7.92 <br> (c) 11.4 | 1,129 | (a) 4.04 <br> (b) 7.91 <br> (c) 11.5 | 1,086 |

| Ultraviolet absorption | Max., m$\mu$ | $E_{1cm}^{1\%}$ | Max., m$\mu$ | $E_{1cm}^{1\%}$ |
|---|---|---|---|---|
| (H$_2$O) | 229 <br> 319 <br> 430 | 317 <br> 28.3 <br> 26.4 | 231 <br> 319 <br> 435 | 328 <br> 30 <br> 26.2 |

| Infrared absorption (KBr) | Cf. Fig. 7 | Cf. Fig. 8 |
|---|---|---|
| Craig's Distribution. | Distribution coefficient at 25° C. in the system n-butanol-benzylalcohol/0.001 N NCl/saturated aqueous NaCl solution (10:5:15:3), 0.372. | Distribution coefficient at 25° C. in the system n-butanol-benzyl alcohol 0.001 N HCl/saturated aqueous NaCl solution (10:5:15:3), 0.175. |
| Paper chromatography. | Rf value in the system tertiary butanol/0.004 N HCl/saturated aqueous NaCl solution (2:1:1); Whatman No. 1 paper impregnated with acetone/H$_2$O/saturated aqueous NaCl solution (6:3:1), 0.59. | Rf value in the system tertiary butanol/0.004 N HCl/saturated aqueous NaCl solution (2: 1:1); Whatman No. 1 paper impregnated with acetone/H$_2$O/saturated aqueous NaCl solution (6:3:1), 0.47. |

The dihydrochlorides of pure ferrimycin $A_1$ and $A_2$ have an antibiotic activity which is about 20,000 times that of the lyophilized culture filtrate. The ferrimycins and their salts can be used not only as medicaments against infections caused by the above mentioned microorganisms but also as disinfectants and as preserving agents.

What is claimed is:

1. Process for the manufacture of the antibiotic ferrimycin, its components, salts and derivatives, wherein a member of the group consisting of the Streptomyces strain *S. lavendulae* A 21510 and mutations of this strain, is grown in a nutrient solution until the latter displays a substantial antibiotic action whereupon a member of the group consisting of the antibiotic ferrimycin, its components, derivatives and salts is isolated from the nutrient solution.

2. Process as claimed in claim 1, wherein the cultivation is carried out under aerobic submerged conditions in an aqueous medium which contains an assimilable carbon source, nitrogenous compounds and inorganic salts.

3. Process as claimed in claim 1, wherein cultivation is carried out for 36 to 120 hours at a temperature between 18 and 40° C., preferably at 27° C.

4. Process as claimed in claim 1, wherein the culture filtrate is separated from the mycelium at a pH between 3 and 5.

5. Process as claimed in claim 1, wherein the antibiotic is isolated from the culture solution by adsorption on a member of the group consisting of active carbon, activated earth and an adsorbent resin.

6. Process as claimed in claim 5, wherein the adsorbed antibiotic is extracted with an acidic eluant.

7. Process as claimed in claim 6, wherein as eluant an organic, water-miscible solvent or a mixture thereof with water is used.

8. Process as claimed in claim 6, wherein as eluant a mixture of methanol and dilute aqueous acetic acid is used.

9. Process as claimed in claim 6, wherein the eluate is concentrated at a low temperature in vacuo and the antibiotic precipitated from the concentrate with acetone.

10. Process as claimed in claim 1, wherein the antibiotic is isolated from the culture solution by adsorption by means of a cation exchanger.

11. Process as claimed in claim 10, wherein the antibiotic is adsorbed by means of a weakly acid ion exchanger containing carboxyl groups and eluted from the latter with an acidic eluant.

12. Process as claimed in claim 10, wherein the antibiotic is adsorbed by means of a buffered ion exchanger containing carboxyl groups and eluted from the latter with an acidic eluant.

13. Process as claimed in claim 1, wherein the antibiotic is enriched by distribution between solutions of phenol in chloroform and aqueous solutions.

14. Process as claimed in claim 13, wherein the phenol content of the chloroform solution is varied with respect to phenol content in the ratios of about 1:1 to about 3:1.

15. Process as claimed in claim 13, wherein the pH-value of the aqueous solution is varied, said pH value being 1 to 6 when the ratio of chloroform solution to phenol is in the ratio of 1:1 and said pH-value being 4 to 6 when the ratio of chloroform solution to phenol is in the ratio of 3:1.

16. Process as claimed in claim 1, wherein the antibiotic is purified by means of chromatography.

17. Process as claimed in claim 16, wherein the antibiotic is purified by means of chromatography on cellulose.

18. Process as claimed in claim 16, wherein the antibiotic is purified by means of chromatography on an ion-exchange resin.

19. Process as claimed in claim 1, wherein the antibiotic is purified by means of distribution between two immiscible solvent phases.

20. Process as claimed in claim 1, wherein the antibiotic is purified by means of electrophoresis.

21. Process as claimed in claim 20, wherein countercurrent electrophoresis is used.

22. Process as claimed in claim 1, wherein the antibiotic is precipitated in aqueous medium with an organic acid of the type of picric acid and the precipitate is isolated.

23. Process as claimed in claim 1, wherein the sparingly soluble salt of the antibiotic with an organic acid of the type of picric acid in an aqueous medium or in a water-miscible organic solvent, preferably methanol or acetone, is reacted with an inorganic acid and the resulting inorganic salt of the antibiotic is isolated.

24. Process as claimed in claim 23, wherein the inorganic salt of the antibiotic, preferably the sulfate, is reacted with an inorganic base whose cation forms with the anion of the antibiotic salt a precipitate which is sparingly soluble in an aqueous medium, and the resulting free base of the antibiotic is isolated.

25. Process as claimed in claim 1, wherein the salts of the antibiotic are converted into the free bases with an anion exchange resin and the latter are isolated.

References Cited in the file of this patent

Waga: J. of Antibiotics, 1953, Ser. A, pages 66–72.
Sokowazaki: J. of Antibiotics, April 1955, Ser. A, pages 39–41.
J. of Antibiotics, vol. 8, No. 6, 1955, page 257.
Hata et al.: J. of Antibiotics, Ser. A, July 1956, pages 141–146.